United States Patent [19]

Vandenabeele

[11] Patent Number: 5,641,419

[45] Date of Patent: Jun. 24, 1997

[54] METHOD AND APPARATUS FOR OPTICAL TEMPERATURE CONTROL

[76] Inventor: Peter Vandenabeele, Veerstraat 49, 3830 Wellen, Belgium

[21] Appl. No.: 256,091

[22] PCT Filed: Nov. 3, 1992

[86] PCT No.: PCT/BE92/00048

§ 371 Date: Jun. 17, 1994

§ 102(e) Date: Jun. 17, 1994

[87] PCT Pub. No.: WO94/10545

PCT Pub. Date: May 11, 1994

[51] Int. Cl.$^6$ ............................................. H05B 1/02
[52] U.S. Cl. .................. 219/497; 219/502; 219/501; 356/45; 356/130
[58] Field of Search ........................... 219/497, 502, 219/503, 501; 356/127–133, 43, 45, 121

[56] References Cited

U.S. PATENT DOCUMENTS

| | | | |
|---|---|---|---|
| 4,729,668 | 3/1988 | Angel et al. | 374/161 |
| 4,818,102 | 4/1989 | Glenn | 356/43 |
| 4,854,724 | 8/1989 | Adams et al. | 374/5 |
| 5,354,323 | 10/1994 | Whitebook | 607/89 |

FOREIGN PATENT DOCUMENTS

| | | |
|---|---|---|
| 1453784 | 9/1966 | France. |
| 0005508 | 12/1985 | Japan. |
| 0472146 | 9/1937 | United Kingdom. |
| 1222167 | 2/1971 | United Kingdom. |

*Primary Examiner*—Mark H. Paschall
*Attorney, Agent, or Firm*—Banner & Witcoff, Ltd.

[57] ABSTRACT

The radiation generated by at least one radiation source is controlled so as to generate a constant radiation intensity, thereby to cause the object to be heated, and the radiation intensity from the object at a first wavelength is sensed until it is equal to the present radiation intensity generated by the at least one radiation source, whereby the temperature of the object has a predetermined value. From that time on, the development of the actual temperature of the object is controlled accurately according to a predetermined program merely by sensing the radiation intensity from the object at a second wavelength larger than the first wavelength, and using the measuring signal representative of the sensed radiation intensity to continuously control the radiation intensity generated by the at least one radiation source.

17 Claims, 2 Drawing Sheets

METHOD AND APPARATUS FOR OPTICAL TEMPERATURE CONTROL

FIELD OF THE INVENTION

The present invention relates to a system for controlling the heating of an object using radiation, in particular a system for controlling the heating of a wafer of semiconductor material for the manufacture of semiconductor components.

BACKGROUND OF THE INVENTION

When heating an object using radiation from a heating source the temperature of the object is currently controlled and measured using pyrometers. Prior art is illustrated e.g. by U.S. Pat. No. 4,755,654; U.S. Pat. No. 4,919,542; U.S. Pat. No. 4,649,261; DE-A-4012615 and F. Roozeboom, Journal Vac. Sc. Techn., B8, 1249 (1990). The temperature measurement provided by pyrometers, however, is highly dependent on the emissivity of the object being heated and therefore measurement of the emissivity is desirable when accurate temperature measurement is required. However, measurement of the emissivity generally cannot be carried out efficiently outside the heating apparatus, i.e. at ambient temperature because under 600° C. the emissivity is depending on the temperature level (P. Vandenabeele et al, Proc. MRS 224, 185, FIG. 4 (1990)). Consequently, it is necessary in practice to provide for in situ measurement of the emissivity above 600° C.

For that purpose, methods have been provided which use external radiation sources arranged for intermittently projecting radiation onto the object to be heated and provide measurement of the reflected radiation from said object. The following documents are cited as prior art references : U.S. Pat. No. 4,956,538; U.S. Pat. No. 4,919,542; U.S. Pat. No. 4,979,133; U.S. Pat. No. 4,890,245; NL-A-8701479; DE-A-2153077. The drawback of these known methods is that the radiation source when used inside a heating chamber has a very narrow angular field of action whereby the emissivity measurement is greatly depending on the roughness of the surface of the object being irradiated. This drawback prevents these known methods from being applied generally (Mosledi et al, Proc. MRS 224, 143, (1990)).

In another known method an extended black body is heated to the same temperature as the object to be heated (U.S. Pat. No. 3,196,690; U.S. Pat. No. 3,969,943; GB-A-2,078,767; DE-A-3,422,590). The radiation from the black body is directed to the object; when the temperature of the black body is equal to the temperature of the object, the radiation from the black body is equal to the sum of the radiation from the object and the reflected radiation from the black body, whereby the temperature measurement of the object is independent from the emissivity.

However, this known compensation method cannot be used in a furnace arranged for fast heating of an object because it is not desirable to arrange a great black body in the heating chamber and because it is not possible that the black body temperature varies as fast as the object.

In order to overcome this drawback, applicant already provided another compensation method using compensation lamps as disclosed in EP-A-0458388, whereby the temperature measurement of an object is independent from the emissivity thereof. In carrying out this method, use is made of pyrometers having a narrow bandwidth and a compensation radiation is controlled as a function of the pyrometer measurement thereby to provide the exact compensation as required. That is, the mean intensity of radiation from the lamps at the pyrometer wavelength is exactly equal to the black body radiation at the temperature of the object. The drawback of the aforementioned method is that the lamps cannot be used any more to heat the object since they are directly controlled as a function of the temperature of the object.

SUMMARY OF THE INVENTION

The aim of the present invention is to provide a method and an apparatus for controlling the temperature of an object independently of the optical characteristics of the object, which allow the same radiation sources to be used both for the compensation procedure and for heating the object.

In accordance with a first aspect of this invention there is thus provided a method of controlling the temperature of an object wherein the radiation generated by at least one radiation source is controlled so as to generate a constant radiation intensity, thereby to cause the object to be heated, and the radiation intensity from the object at a first wavelength is sensed until it is equal to the present radiation intensity generated by the at least one radiation source, whereby the temperature of the object has a predetermined value. From that time on, the development of the actual temperature of the object is controlled accurately according to a predetermined programme merely by sensing the radiation intensity from the object at a second wavelength larger than the first wavelength, and using the measuring signal representative of the sensed radiation intensity to continuously control the radiation intensity generated by the at least one radiation source.

According to a second aspect of this invention there is provided an exemplary apparatus for carrying out the method of the invention.

An advantage of this invention is that there is provided a method able to measure accurately the temperature of an object independently of the optical characteristics of the object and to thereby permit the temperature of the object to be continuously controlled according to a predetermined heating program.

Further, this invention makes it possible to accurately control the temperature at different locations on an object, e.g. a semiconductor wafer, by using different pairs of radiation detectors, whereby each pair of detectors is directed to a respective location on the object.

In addition, when using at least one third radiation detector, the invention is also able to achieve a continuous control of the reflectivity of the object at different locations thereon. Each third detector must be calibrated to sense radiation intensity at a third wavelength at which the radiation sensed is almost comprised of reflected radiation. Such a reflectivity control can be used e.g. for the continuous control of the deposition and growing of semiconductor layers on a wafer.

These and other objects and features of the invention will become more apparent from the following description taken in conjunction with the accompanying drawings.

DESCRIPTION OF AN EXEMPLARY EMBODIMENT

Figure 1:
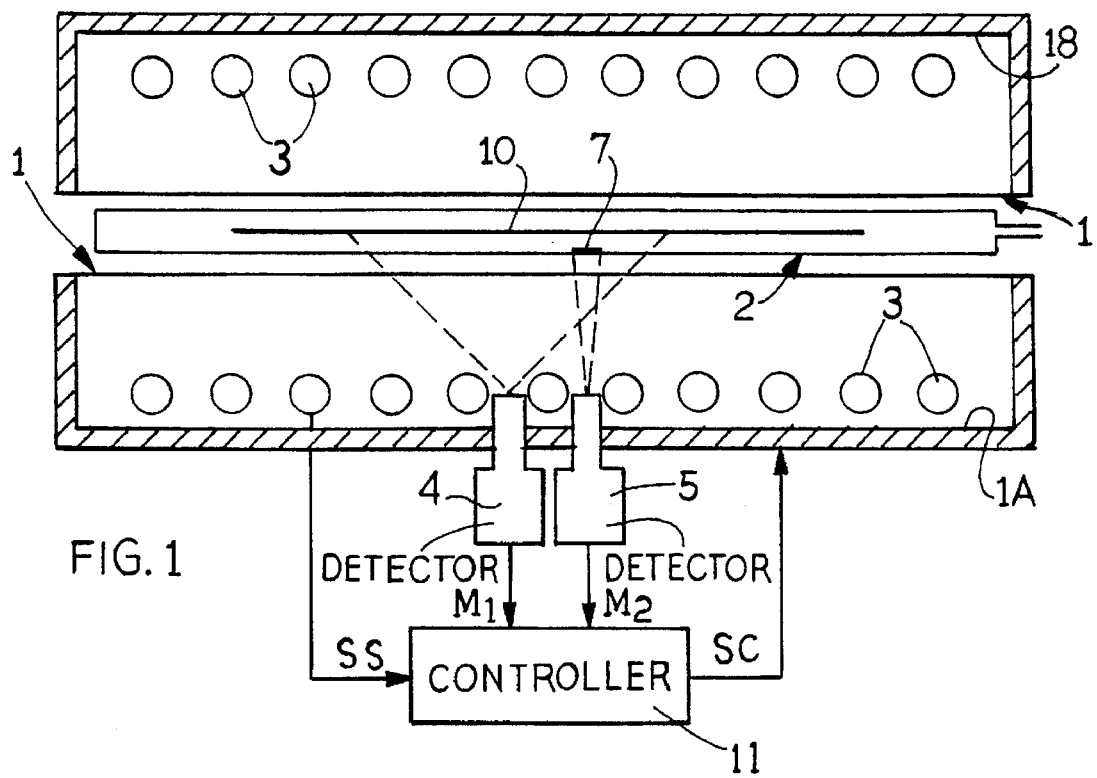
FIG. 1 is a schematic diagram of an exemplary apparatus for carrying out the method of this invention.

Referring to FIG. 1 there is shown a heating chamber 1 having preferably reflecting walls 1A, 1B. Inside the heating chamber is positioned a tube 2 made of quartz within which is placed an object 10 to be heated, e.g. a silicon wafer. Along two opposed inner walls of the chamber there are arranged a number of heating sources 3, e.g. halogen lamps, thereby to permit object 10 to be heated from both sides. In a variant of embodiment the heating sources can be arranged along one inner wall as well whereby the object is heated from one side only. Two radiation detectors 4 and 5 (e.g. pyrometers) are mounted in holes through one wall of the chamber so as to be directed to the object to be heated thereby to be able to measuring the radiation from said object while it is being heated.

In accordance with the invention, a first detector, e.g. detector 4, is calibrated for measuring radiation at a first wavelength $\lambda 1$ (e.g. between 1.5. and 3.5 µm) and the second pyrometer 5 is calibrated for measuring radiation at a second larger wavelength $\lambda 2$ (e.g. 2.7, 3.5, 4.5 µm). The first detector 4 is advantageously chosen to have a relatively wide angular field of view. When the radiation intensity at said second wavelength $\lambda 2$ is low, the second detector 5 may have a relatively narrow angular field of view, otherwise it is advantageously chosen to have a relatively wide angular field of view as well. Preferably, across the field of view of the second detector there is placed a window-shaped filter adapted to pass radiation at the second wavelength. In a particular embodiment, the filter 7 is mounted in an opening formed in the quartz tube 2. The detectors are connected to a control unit 11 arranged to produce a control signal for the radiation sources 3 in order to control the radiation therefrom and thus control temperature of the object during the heating process as a function of the sensed radiation intensity.

In operation, the radiation sources or lamps 3 generate radiation which irradiates object 10 thereby to heating the object at a substantially constant speed, e.g. with an increase of about 100° C./s. The radiation from the lamps 3 is controlled by control unit 11 as a function of a source sensing signal SS representing a radiation parameter of the source, e.g. the lamp resistance and/or power and the temperature of the quartz tube 2. The lamp resistance and/or power is measured by means known per se. The temperature of the tube can be measured directly with a pyrometer at a 5 µm wavelength or by measuring the exhaust temperature of the cooling air that is used to cool the quartz tube. Detector 4 senses the radiation at $\lambda 1$, which is the sum of the radiation originating from object 10 and the radiation reflected by said object and/or the radiation transmitted through object 10 at wavelength $\lambda 1$.

The radiation intensity sensed by detector 4 is given by $$I_{pyro1}=e_1 I_{bb1}+(1-e_1)I_{S1} \tag{1}$$

where $e_1$ is the effective emissivity of the object at wavelength $\lambda 1$ $I_{bb1}$ is the intensity of black body radiation of the object $I_{S1}$ is the radiation intensity of the sources at wavelength $\lambda 1$.

At the time when $I_{S1}=I_{bb1}$, relation (1) becomes $$I_{pyro1}=I_{S1} \tag{2}$$

Thus, the radiation intensity sensed by detector 4 at that time is independent from the emissivity of the object.

Figure 2:
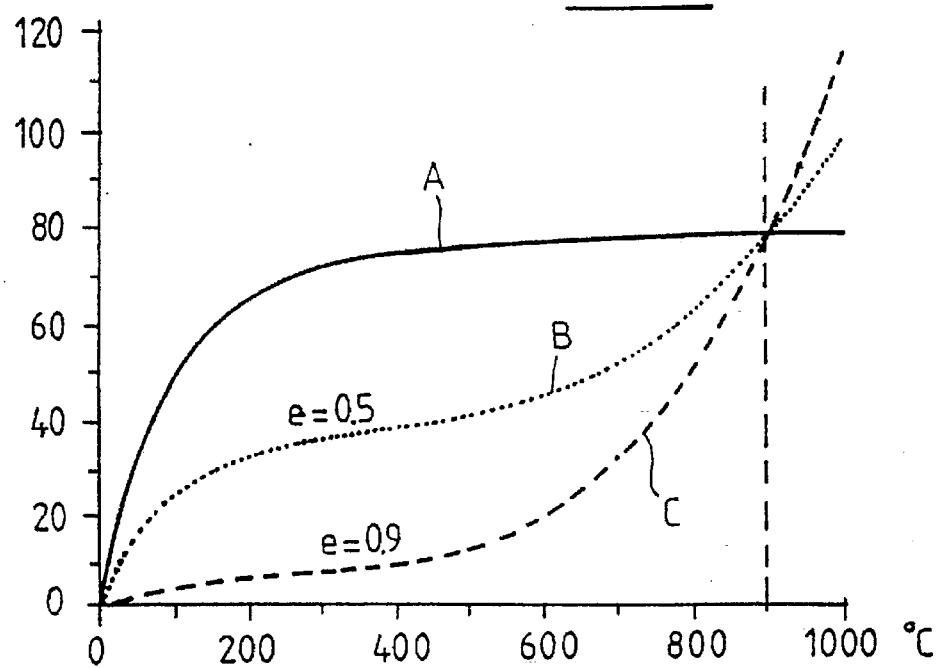
FIG. 2 shows typical radiation intensity curves as a function of the temperature of an object being heated.

FIG. 2 shows a typical lamp intensity curve (curve A) and exemplary pyrometer intensity curves (curves B and C) at an exemplary wavelength of 2.27 µm as a function of temperature for two emissivity values of an object being heated. The intersecting point of curve A with curve B or C defines the exact temperature of the object (e.g. 900° C.).

It is emphasized that the radiation sources in the apparatus according to the invention serve both for heating the object and for compensation purposes.

The control unit 11 receives the measuring signal M1 from detector 4 until the sensed radiation intensity $I_{pyro1}$ is equal to the radiation intensity $I_{S1}$ generated by the lamps. At that time, as explained hereinbefore, the exact temperature of the object being heated is accurately defined since its black body radiation is known. From that time on, the control unit is able to continuously control the temperature according to an accurate heating programme as outlined hereafter.

At the time when the pyrometer intensity at wavelength $\lambda 1$ is equal to the lamp radiation intensity, the second detector 5 is calibrated at wavelength $\lambda 2$ as a function of the known temperature of the object (e.g. 900° C. in the example shown above) and the known radiation intensity generated by the lamps at wavelength $\lambda 2$. The radiation intensity sensed at detector 5 is given by:

$$I_{pyro2}=e_2 I_{bb2}+(1-e_2)I_{S2} \tag{3}$$

Figure 3:
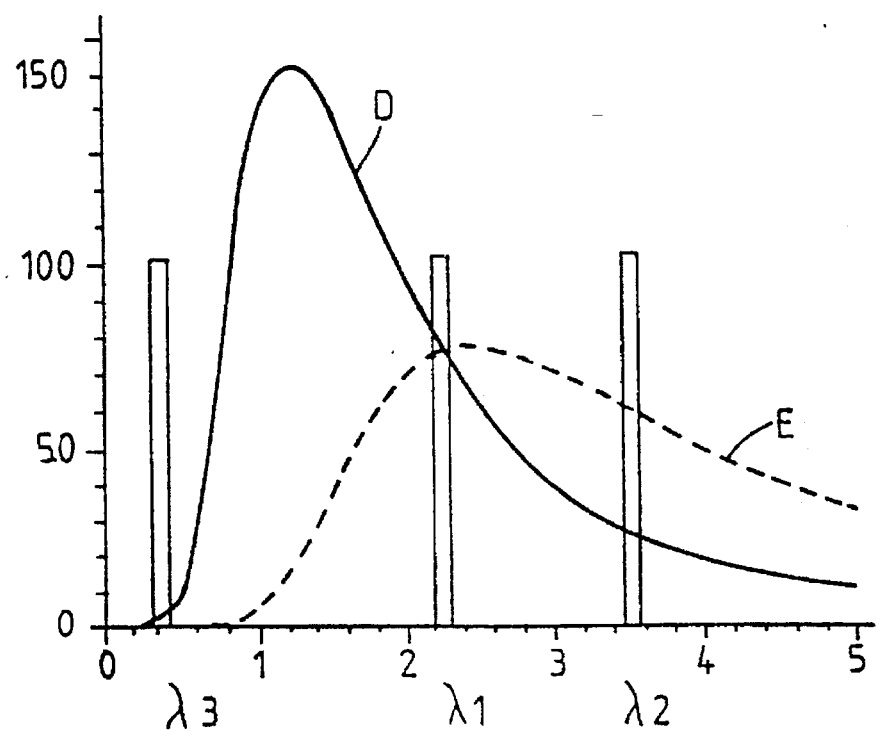
FIG. 3 shows typical spectral intensity curves for a heating lamp and the black body radiation of an exemplary object.

FIG. 3 shows typical spectral intensity curves for a heating lamp (curve D) and the black body radiation of an exemplary object (curve E) at the compensation temperature (e.g. 900° C.). It can be seen that the radiation intensity is the same for both curves at wavelength $\lambda 1$ (e.g. 2.27 µm). At wavelength $\lambda 2$ (e.g. 3.5 µm) the lamp radiation intensity is substantially lower than the black body radiation intensity of the object.

Because of the larger wavelength $\lambda 2$, the reflected radiation from the object is much lower than at wavelength $\lambda 1$ and consequently the radiation sensed at detector 5 is substantially originated from the object depending on its emissivity coefficient $e_2$.

In relation (3) hereabove, $I_{pyro2}$ is known from the measurement M2, $I_{bb2}$ is known from the temperature of the object at that time and $I_{S2}$ is known from calibration. Thus, relation (3) makes it possible to determine the emissivity value $e_2$ of the object being heated at wavelength $\lambda 2$:

$$e_2 = \frac{I_{pyro2} - I_{S2}}{I_{bb2} - I_{S2}} \tag{4}$$

The control unit 11 is adapted to use relation (4) to determine the emissivity value $e_2$ of the object at wavelength $\lambda 2$ and, based on said value $e_2$, to produce a control signal SC for performing a continuous control of the heating process.

In this manner, the invention makes it possible to continuously and accurately control the temperature of an object in accordance with a predetermined heating program.

Further, this invention makes it possible to accurately control the temperature at several different locations on an object, e.g. a semiconductor wafer. For that purpose, use is made of different pairs of first and second radiation detectors, each directed to a respective location or area on the object to be heated.

Figure 4:
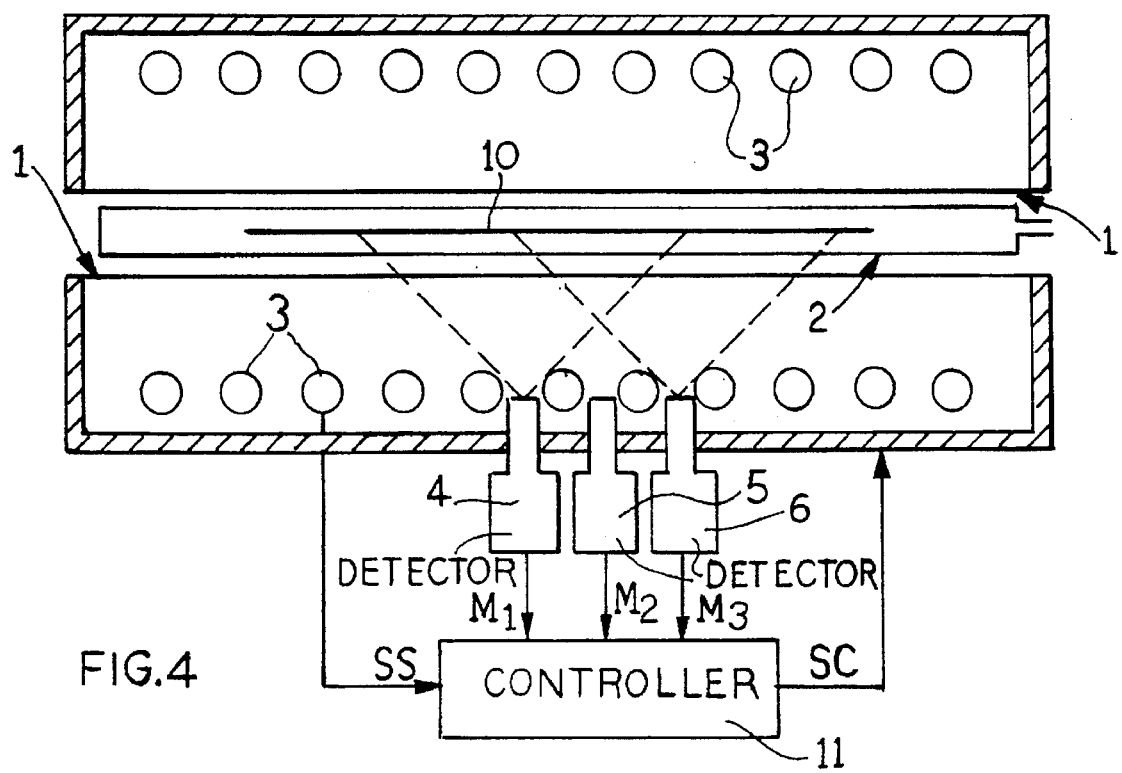
FIG. 4 is a schematic diagram of a second exemplary embodiment of the apparatus for carrying out the method of the invention

In addition, when using at least one third radiation detector as shown in FIG. 4, the invention is able to achieve a continuous control of the reflectivity of the object at different locations or areas thereon. Each third radiation detector 6 is adapted to sense radiation at a third wavelength λ3 chosen for instance lower than λ1, e.g. a wavelength between 0.3 and 0.8 μm, at which wavelength the sensed radiation is almost comprised of lamp radiation, reflected by the object being heated. Since the radiation intensity from the lamps is known from calibration, the measuring signal M3 from the third radiation detector enables the control unit 11 to determine the reflectivity of the object. At the said low wavelength λ3, the third detector is sensitive to minor variations in thickness or the optical characteristics of the object. Such a property is advantageously used to control the deposition and growing of semiconductor layers on a wafer.

I claim:

1. A method for optical temperature control of an object placed inside a heating chamber including at least one radiation source by means of at least one radiation detector directed to said object so as to sense the radiation intensity from the object, comprising the steps of:

controlling the at least one radiation source so as to generate a source radiation intensity, thereby to cause the object to be heated, sensing the radiation intensity from the object at a first wavelength until said radiation intensity is equal to the source radiation intensity, whereby the temperature of the object has a predetermined value, sensing the radiation intensity from the object at a second wavelength larger than the first wavelength, and using the sensed radiation intensity at the second wavelength to further control the source radiation intensity, thereby to control the development of the temperature of said object.

2. A method as claimed in claim 1, wherein the first and second wavelength radiation intensities are sensed using one radiation detector having means to calibrate the detector at said first and said second wavelength.

3. A method as claimed in claim 1, wherein the first and second wavelength radiation intensities are sensed using two radiation detectors, one being calibrated at said first wavelength and the second being calibrated at said second wavelength.

4. A method as claimed in claim 1, further comprising the step of sensing the radiation intensity from the object at a third wavelength lower than the first wavelength and using the measuring signal representative of the sensed radiation intensity to determine the present reflectivity of the object at a particular location of said object.

5. An apparatus for optical temperature control of an object comprising a chamber including at least one radiation source positioned so as to irradiate an object placed inside the chamber, a radiation detector positioned to be directed to an object placed inside the chamber so as to sense the radiation from the object at a first wavelength and produce a first measuring signal representative of the sensed radiation, and a control unit connected to receive the signal for controlling the radiation source, further comprising at least one second radiation detector positioned to sense radiation from the object, said second radiation detector being calibrated to a second wavelength different from the first wavelength thereby to sense a radiation intensity substantially different from the radiation intensity at said first wavelength at the first radiation detector, and producing a second measuring signal representative of the sensed radiation intensity at said second wavelength, means for sensing the radiation intensity of the at least one radiation source, and means for producing a source intensity signal representative of the radiation intensity of the at least one radiation source, wherein the control unit is arranged to produce a continuous control signal for the radiation source as a function of the second measuring signal in response to the first measuring signal being equal to said source intensity signal.

6. An apparatus as claimed in claim 5, further comprising a window-shaped filter having a predetermined size positioned across a field of view of the second radiation detector, said filter being adapted to pass radiation at said second wavelength.

7. An apparatus as claimed in claim 6, wherein the second radiation detector has a field of view substantially corresponding to the size of the filter.

8. An apparatus as claimed in claim 7, wherein the window-shaped filter is mounted in an opening formed in a tube arranged to receive the object to be heated.

9. An apparatus as claimed in claim 5, further comprising at least one third radiation detector directed to the object to sense radiation intensity from the object at a third wavelength lower than the first wavelength and produce a third measuring signal representative of the sensed radiation intensity, the output of said third radiation detector being connected to the control unit, said control unit being arranged to determine the reflectivity of a particular area on the object as a function of said third measuring signal.

10. An apparatus for optical temperature control of an object, comprising:

at least one radiation source positioned to irradiate the object, said at least one radiation source having a controllable intensity;

means for sensing the intensity of said at least one radiation source and generating a corresponding source signal;

a first radiation detector positioned to detect radiation at a first wavelength, said first radiation detector generating a first signal representing an intensity of radiation detected at the first wavelength;

a second radiation detector positioned to detect radiation at a second wavelength, said second radiation detector generating a second signal representing an intensity of radiation detected at the second wavelength; and a controller coupled to the at least one radiation source, the first radiation detector and the second radiation detector, wherein said controller compares said first signal to said source signal and generates a control signal for adjusting the controllable intensity of the at least one radiation source in accordance with the second signal.

11. An apparatus as claimed in claim 10, wherein said first radiation detector and said second radiation detector are directed to a first location on said object.

12. An apparatus as claimed in claim 11, further comprising an additional first radiation detector and an additional second radiation detector, wherein said additional first and second radiation detectors are directed to a second location on said object that is different than said first location on the object, whereby temperature control at different locations on the object is obtained.

13. An apparatus as claimed in claim 10, wherein the object is a semiconductor wafer.

14. An apparatus as claimed in claim 10, wherein said second wavelength is larger than said first wavelength.

15. An apparatus as claimed in claim 10, further comprising a tube within which said object is mounted.

16. An apparatus as claimed in claim 15, wherein said at least one radiation source comprises a halogen lamp.

17. An apparatus as claimed in claim 16, wherein said sensing means comprises at least one of a lamp resistance measuring device, a lamp power measuring device and a tube temperature measuring device.

* * * * *